(12) United States Patent
Roh et al.

(10) Patent No.: US 9,509,959 B2
(45) Date of Patent: Nov. 29, 2016

(54) ELECTRONIC DEVICE AND CONTROL METHOD THEREOF

(71) Applicant: LG ELECTRONICS INC., Seoul (KR)

(72) Inventors: Hyeongseok Roh, Seoul (KR); Myunghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 230 days.

(21) Appl. No.: 14/209,766

(22) Filed: Mar. 13, 2014

(65) Prior Publication Data

US 2015/0015690 A1    Jan. 15, 2015

(30) Foreign Application Priority Data

Jul. 10, 2013   (KR) ........................ 10-2013-0081220

(51) Int. Cl.

| | |
|---|---|
| H04N 7/18 | (2006.01) |
| G06F 3/00 | (2006.01) |
| G06F 3/01 | (2006.01) |
| G06F 3/0484 | (2013.01) |
| G06F 3/041 | (2006.01) |
| G06K 9/00 | (2006.01) |
| G10L 15/26 | (2006.01) |
| H04R 3/00 | (2006.01) |
| H04N 5/232 | (2006.01) |
| H04N 21/414 | (2011.01) |
| H04N 21/422 | (2011.01) |
| H04N 21/4223 | (2011.01) |
| H04N 21/4788 | (2011.01) |
| G06F 3/16 | (2006.01) |

(52) U.S. Cl.
CPC ............ *H04N 7/18* (2013.01); *G06F 3/005* (2013.01); *G06F 3/011* (2013.01); *G06F 3/017* (2013.01); *G06F 3/0412* (2013.01); *G06F 3/0484* (2013.01); *G06K 9/00302* (2013.01); *G10L 15/265* (2013.01); *H04N 5/23219* (2013.01); *H04N 21/41407* (2013.01); *H04N 21/422* (2013.01); *H04N 21/4223* (2013.01); *H04N 21/42203* (2013.01); *H04N 21/4788* (2013.01); *H04R 3/00* (2013.01); *G06F 3/167* (2013.01); *H04N 5/23293* (2013.01)

(58) Field of Classification Search
None
See application file for complete search history.

(56) References Cited

U.S. PATENT DOCUMENTS

| | | |
|---|---|---|
| 2009/0244354 A1 | 10/2009 | Sakaguchi |
| 2009/0317060 A1 | 12/2009 | Han et al. |
| 2010/0182442 A1 | 7/2010 | Maeng |

(Continued)

FOREIGN PATENT DOCUMENTS

JP    2010-237761 A    10/2010

OTHER PUBLICATIONS

European Search report dated Dec. 12, 2014 issued in Application No. 14 001 013.3.

*Primary Examiner* — Kate Luo
(74) *Attorney, Agent, or Firm* — KED & Associates, LLP

(57) ABSTRACT

An electronic device and a control method thereof are disclosed. The electronic device includes: a touch screen; a camera; a microphone; and a controller configured to display the execution screen of a predetermined application on the touch screen, control the camera and the microphone to operate upon entering reaction capture mode, acquire a reaction image by capturing a video or still image of a user through the camera upon detecting the user making a facial expression or gesture through the camera or the user's voice through the microphone, and display the acquired reaction image on the touch screen. Accordingly, an image of the user seeing a predetermined screen running on the touch screen can be capture and displayed on the touch screen.

13 Claims, 25 Drawing Sheets

(56) References Cited

U.S. PATENT DOCUMENTS

2011/0158546 A1 6/2011 Huang et al.
2011/0211813 A1* 9/2011 Marks ................ G06F 17/3089
 386/297
2013/0083222 A1* 4/2013 Matsuzawa ........ H04N 5/23212
 348/240.3

* cited by examiner

FIG. 7
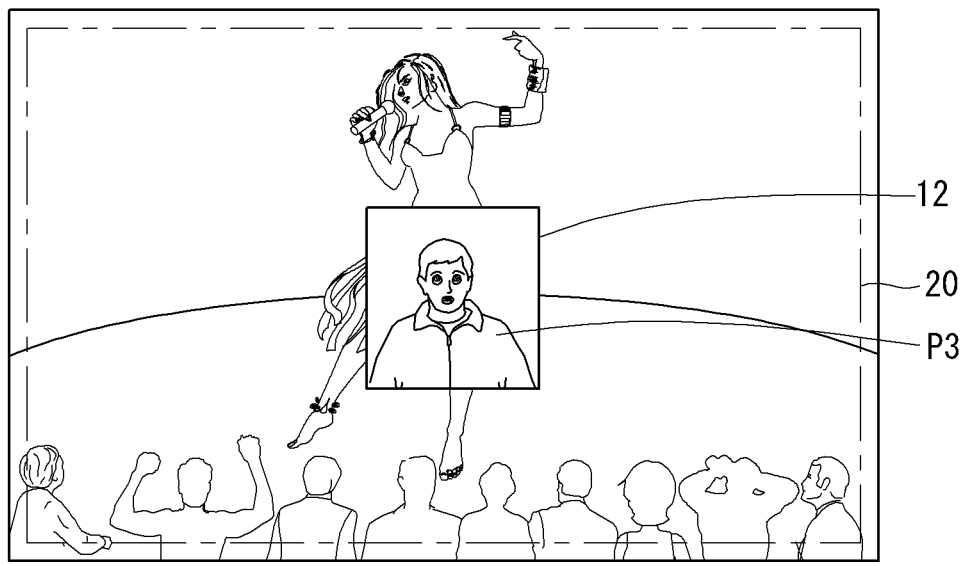
(a)
(b)

FIG. 8
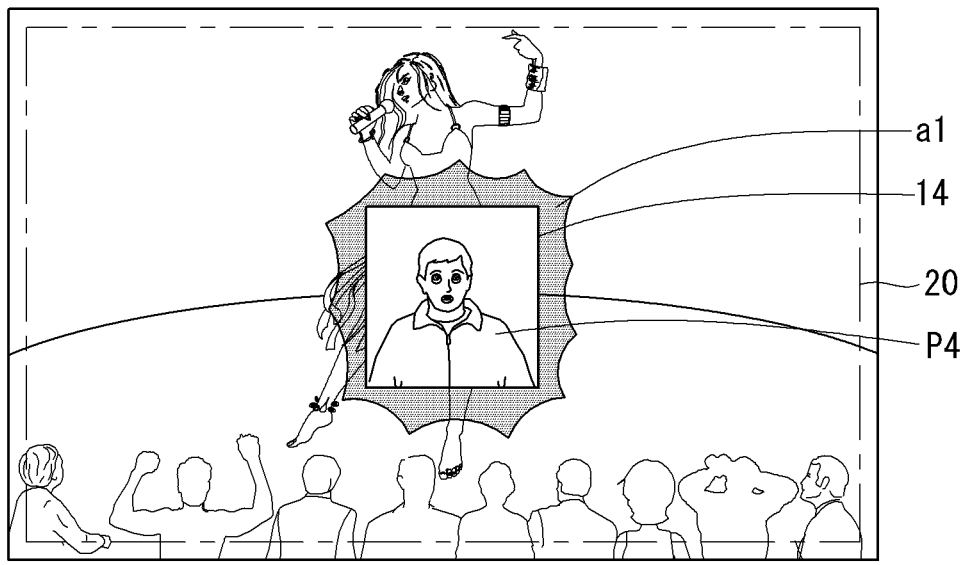
(a)
(b)

FIG. 9
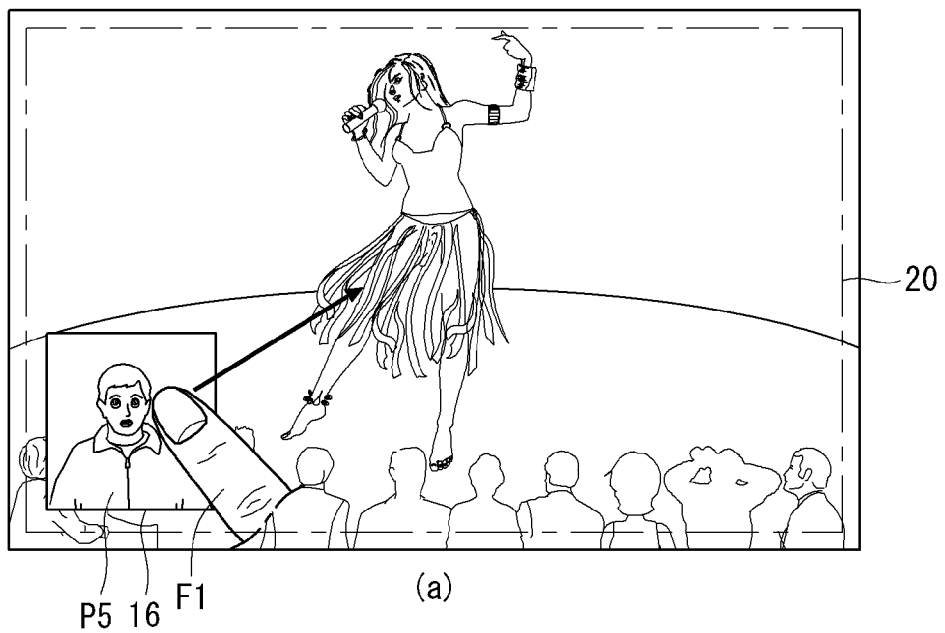
(a)
(b)

FIG. 10
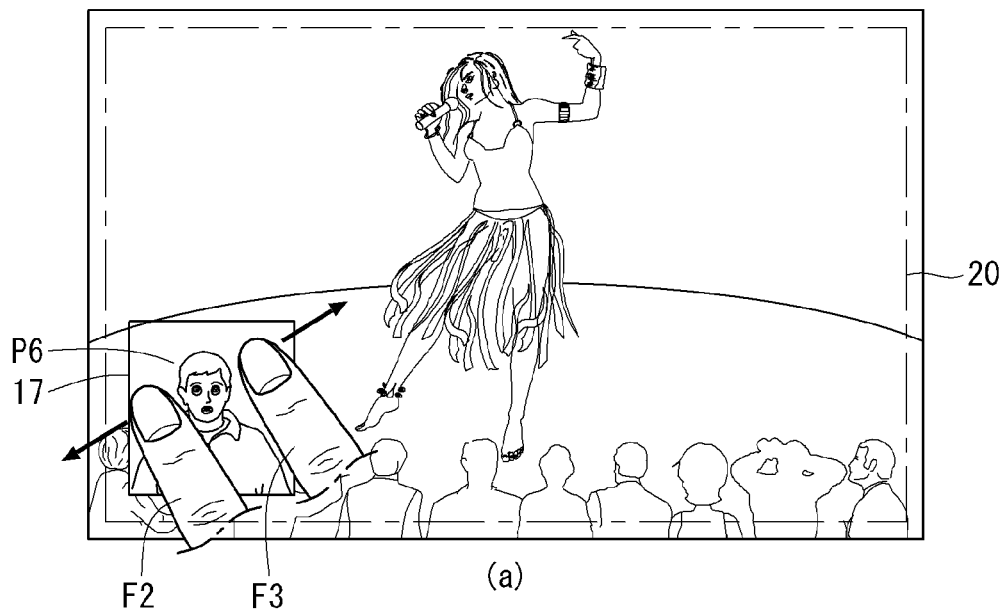
(a)
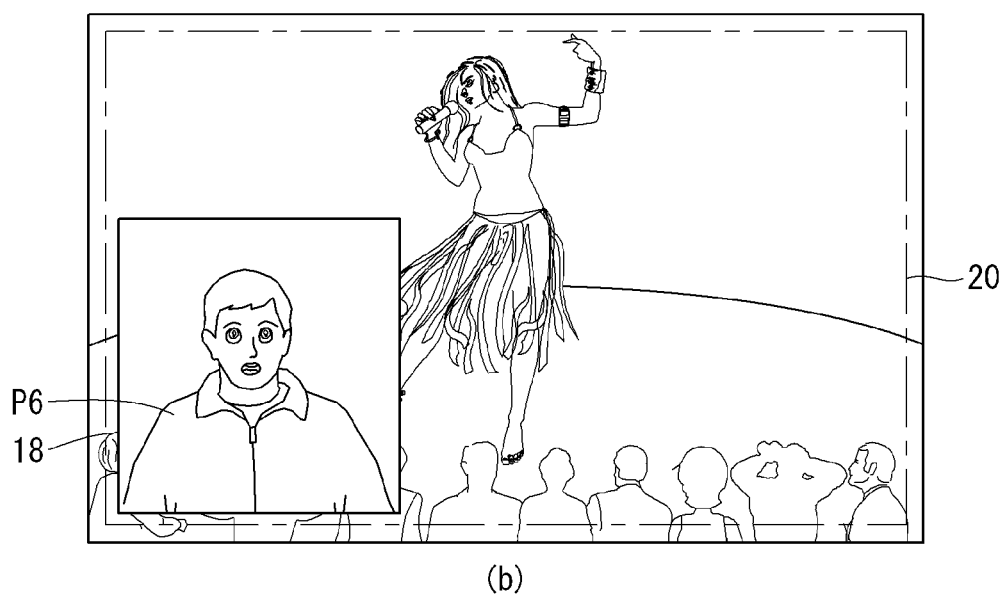
(b)

FIG. 12
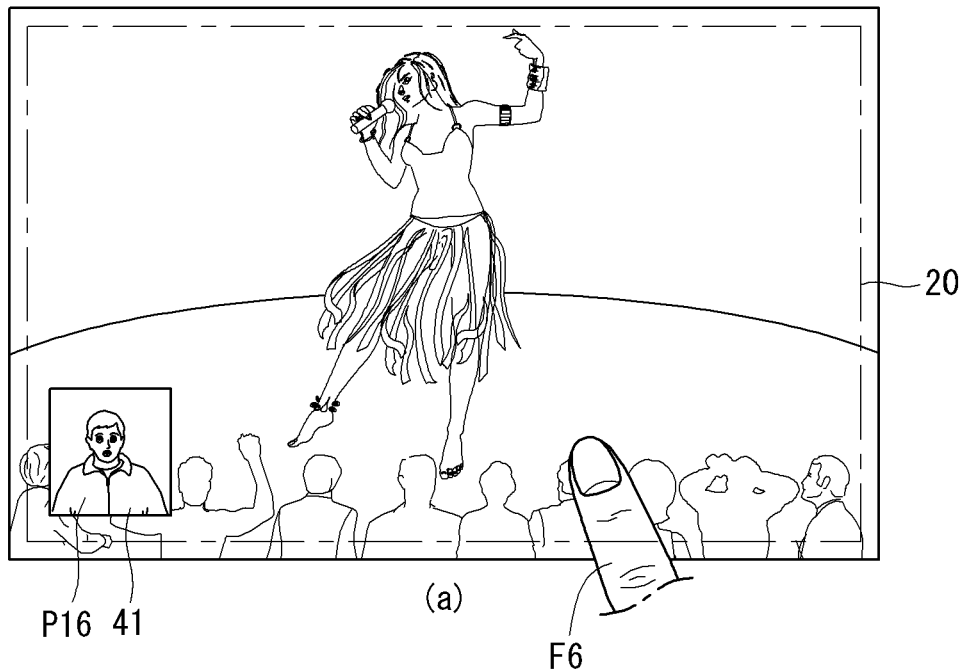
(a)
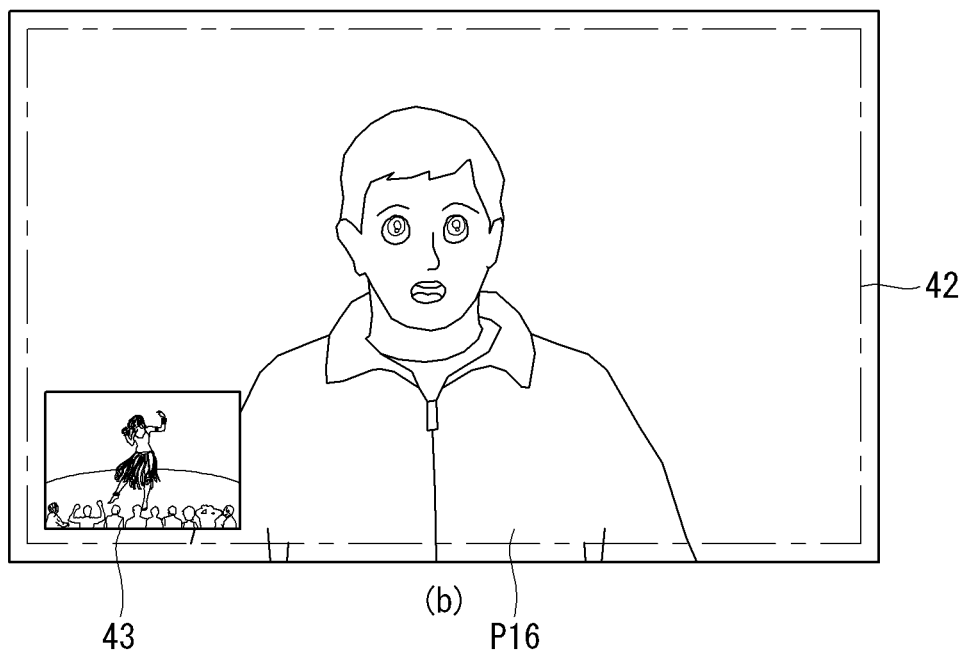
(b)

FIG. 18
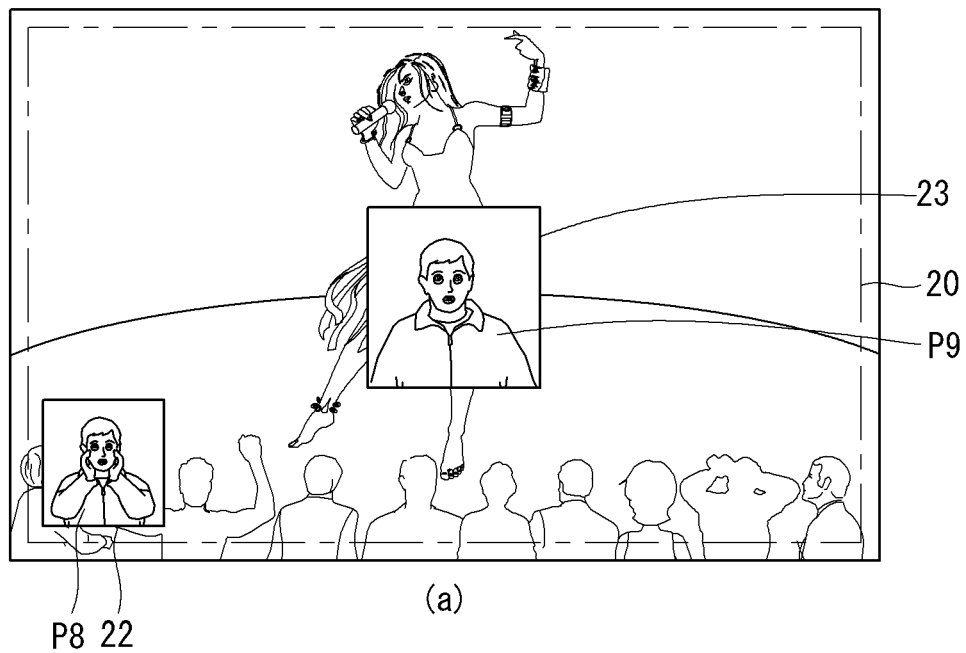
(a)
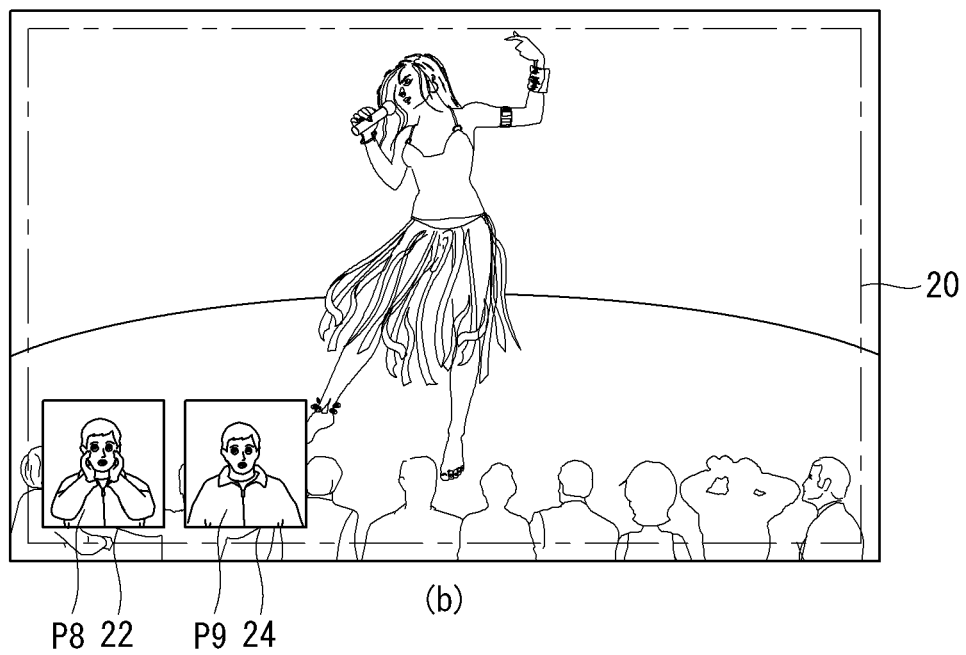
(b)

FIG. 19
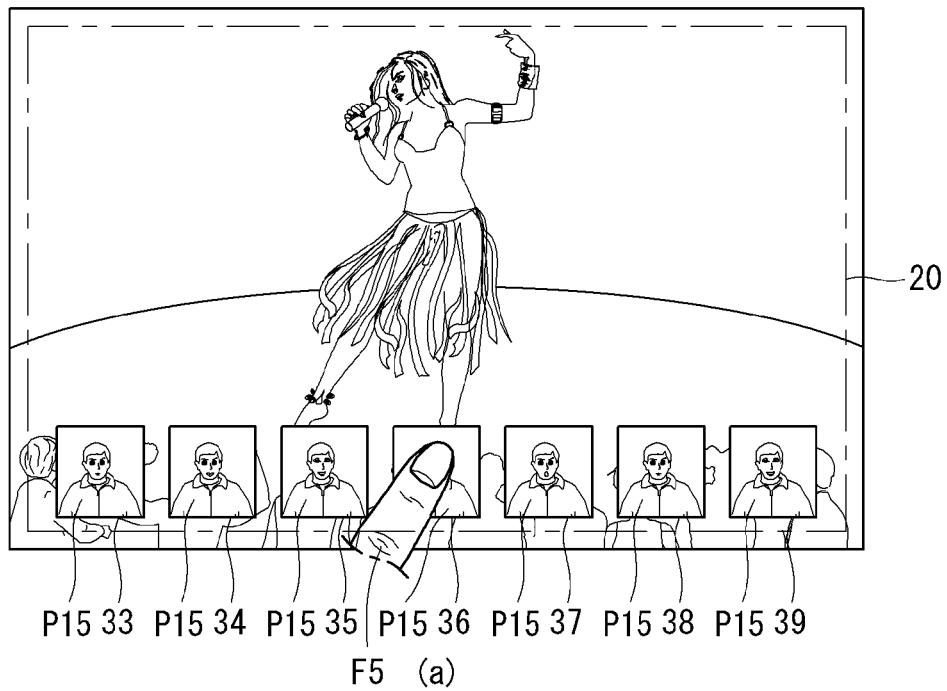
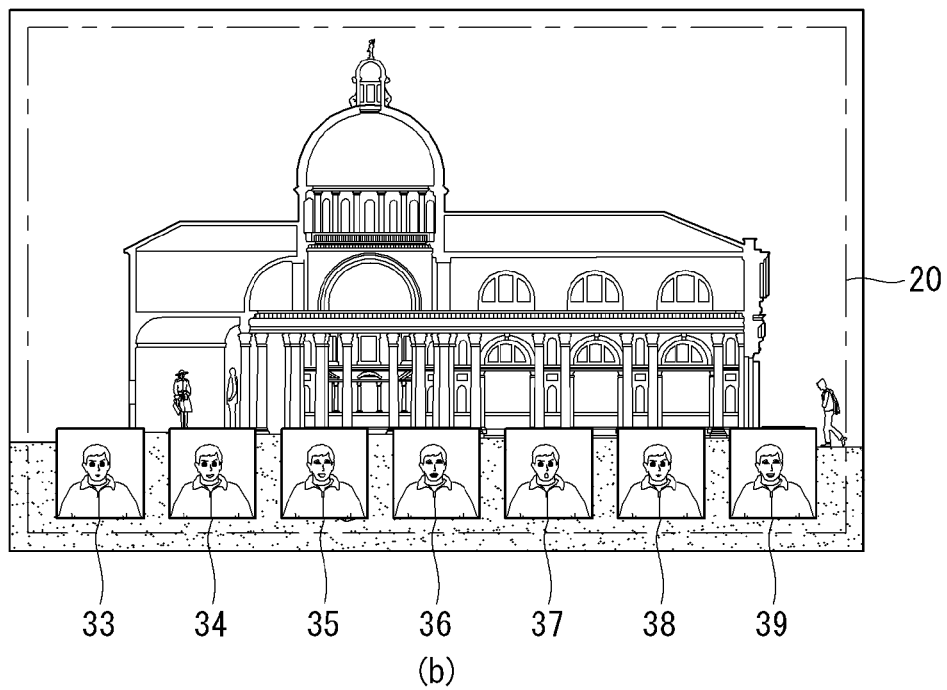

FIG. 20
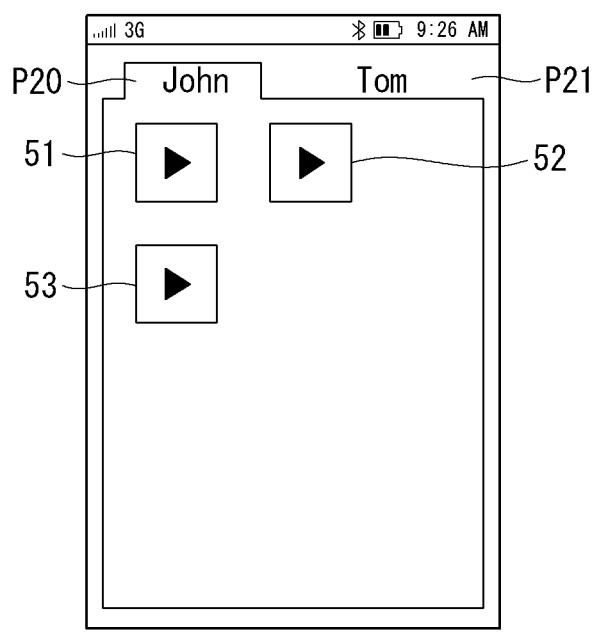
(a)
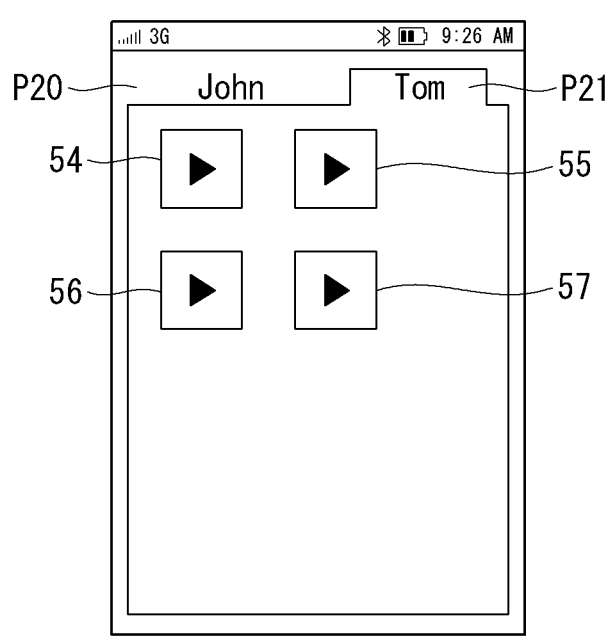
(b)

FIG. 21
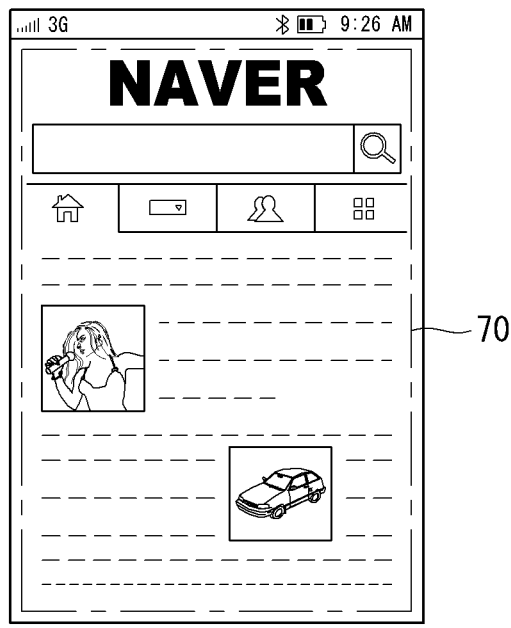
(a)
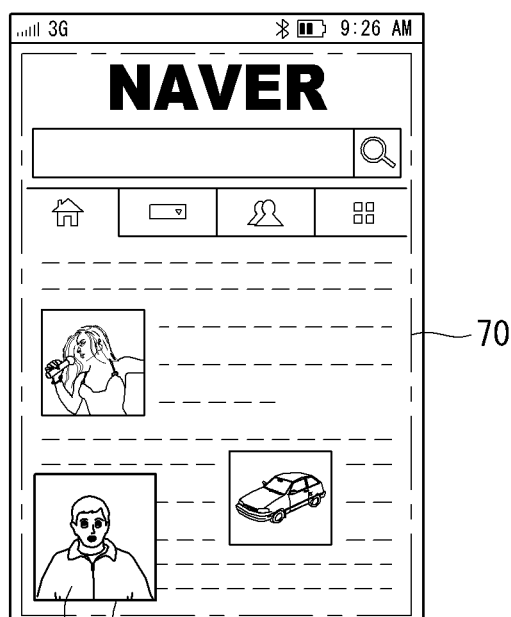
(b)

FIG. 22
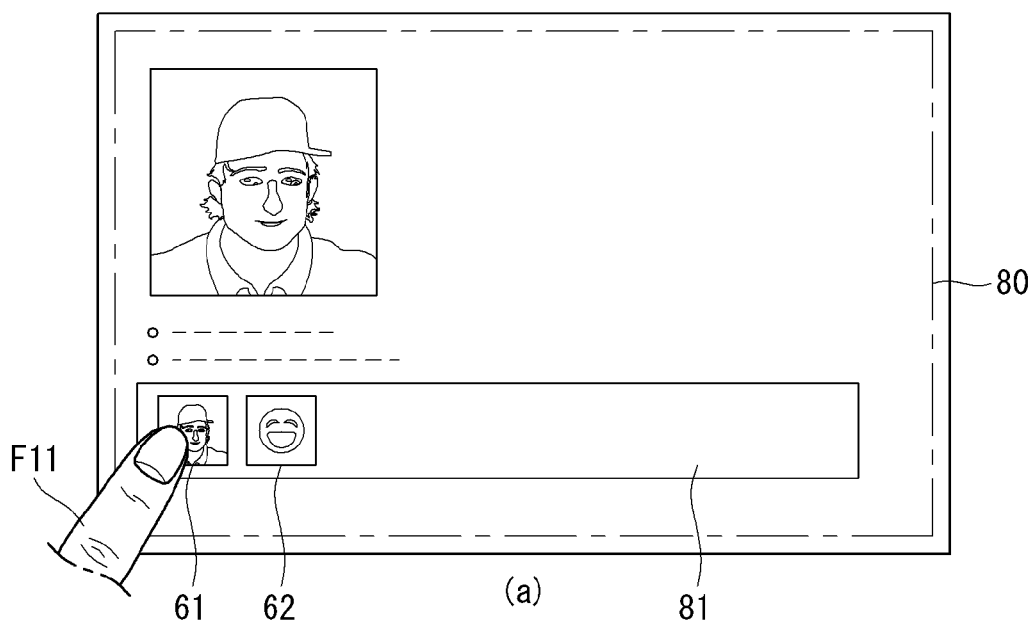
(a)
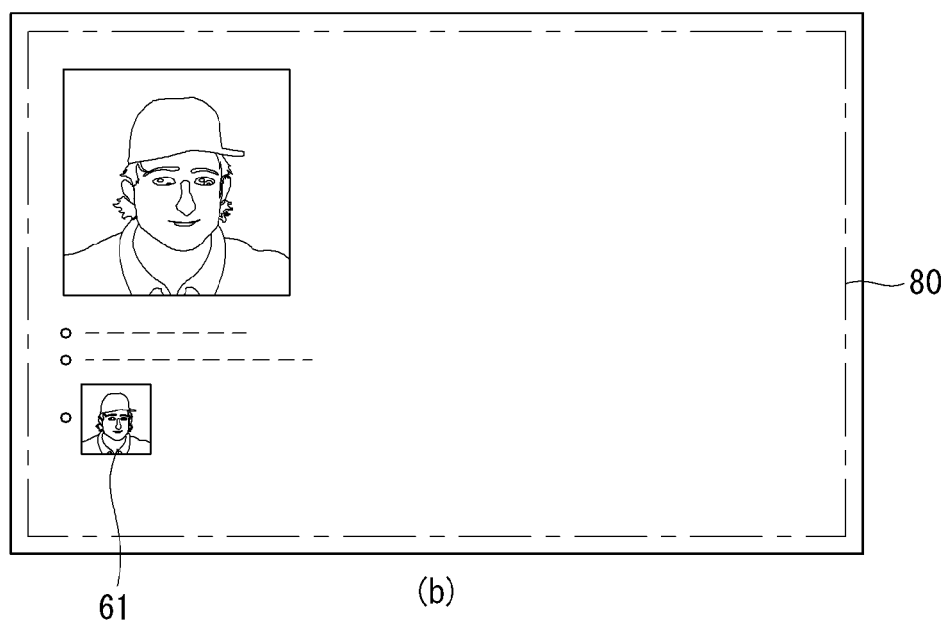
(b)

ELECTRONIC DEVICE AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2013-0081220, filed on Jul. 10, 2013, the contents of which are incorporated by reference herein in their entirety.

TECHNICAL FIELD

The present invention relates to an electronic device and a control method thereof, and more particularly, to capturing an image of a user seeing a predetermined display running on a touch screen and displaying it on the touch screen.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable. As various terminals including a mobile terminal provide a variety of complicated functions, menu structures also become complicated. Furthermore, a function of displaying digital documents including web pages through a terminal is added.

SUMMARY

An object of the present invention is to provide an electronic device which is capable of capturing an image of a user seeing a predetermined display running on a touch screen and displaying it on the touch screen, and a control method thereof. It is to be understood that technical objects to be achieved by the present invention are not limited to the aforementioned technical object and other technical objects which are not mentioned herein will be apparent from the following description to one of ordinary skill in the art to which the present invention pertains.

To accomplish the above object, an embodiment of the present invention provides an electronic device including: a touch screen; a camera; a microphone; and a controller configured to display the execution screen of a predetermined application on the touch screen, control the camera and the microphone to operate upon entering reaction capture mode, acquire a reaction image by capturing a video or still image of a user through the camera upon detecting the user making a facial expression or gesture through the camera or the user's voice through the microphone, and display the acquired reaction image on the touch screen.

The execution screen of the predetermined application may include at least one of the following: the execution screen of a video application, the execution screen of an SNS (social networking service), the execution screen of a messaging application, and the screen of a webpage.

If the user's facial expression or gesture is detected through the camera for a predetermined time or more, or the user's voice is detected through the microphone for the predetermined time or more, the controller may acquire the reaction image as a video, and if the user's facial expression, gesture, or voice is detected for less than the predetermined time, the controller may acquire the reaction image as a still image.

The controller may display the acquired reaction image in an overlapping way on the execution screen of the predetermined application.

The electronic device may further include a memory, and the controller may save the execution screen of the predetermined application displaying the acquired reaction image as a single file in the memory.

Upon detecting a plurality of users through the camera, the controller may acquire a captured reaction image of any one of the plurality of users who is detected making a facial expression or gesture or letting out a voice.

If at least either the detected facial expression, the detected gesture, or the detected voice satisfies a predetermined condition, the controller may change at least one of the size, display position, and transparency of the reaction image.

The controller may change at least one of the size, display position, and transparency of the reaction image, based on a predetermined input signal from the user.

The controller may continuously capture the still image a plurality of times through the camera.

The controller may display the acquired reaction image in thumbnail form on the touch screen.

Upon receiving an input for choosing any one of the reaction images displayed in thumbnail form, the controller may display on the touch screen the execution screen of the application corresponding to the point in time when the chosen reaction image is acquired.

To accomplish the above object, an embodiment of the present invention provides a control method of an electronic device, the method including: displaying the execution screen of a predetermined application on the touch screen; controlling the camera and the microphone to operate upon entering reaction capture mode; detecting the user making a facial expression or gesture through a camera or the user's voice through a microphone; acquiring a reaction image by capturing a video or still image of the user through the camera; and displaying the acquired reaction image on the touch screen.

In the displaying of the execution screen of the predetermined application, at least one of the following: the execution screen of a video application, the execution screen of an SNS (social networking service), the execution screen of a messaging application, and the screen of a webpage may be displayed.

In the displaying of the acquired reaction image on the touch screen, the acquired reaction image may be displayed in an overlapping way on the execution screen of the predetermined application.

In the acquiring of a captured reaction image of the user, upon detecting a plurality of users through the camera, a captured reaction image of any one of the plurality of users who is detected making a facial expression or gesture or letting out a voice may be acquired.

The electronic device and the control method thereof according to the present invention have the following advantages.

According to the present invention, a reaction from a user who has seen a video, a webpage, etc may be shared with other people.

Furthermore, the moment when the user reaction is detected can be recognized more intuitively.

Furthermore, a facial expression, gesture, etc of the user can be intuitively recognized by continuously capturing the user a plurality of times.

Furthermore, when a plurality of users are playing and watching a video at different points in time, reaction images of the users can be acquired, combined, and shared.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 6 to 13 are views showing an example of the touch screen where a captured reaction image of a user is displayed.

FIG. 18 is a view for explaining the third embodiment of the present invention.

FIG. 19 is a view for explaining a fourth embodiment of the present invention.

FIG. 20 is a view showing an example where a file of a captured reaction image is saved and managed according to the present invention.

FIG. 21 is a view showing an example of a touch screen which displays a reaction image on the screen of a webpage.

FIG. 22 is a view showing an example of a touch screen which displays a reaction image on the execution screen of an SNS.

DETAILED DESCRIPTION

Figure 1:
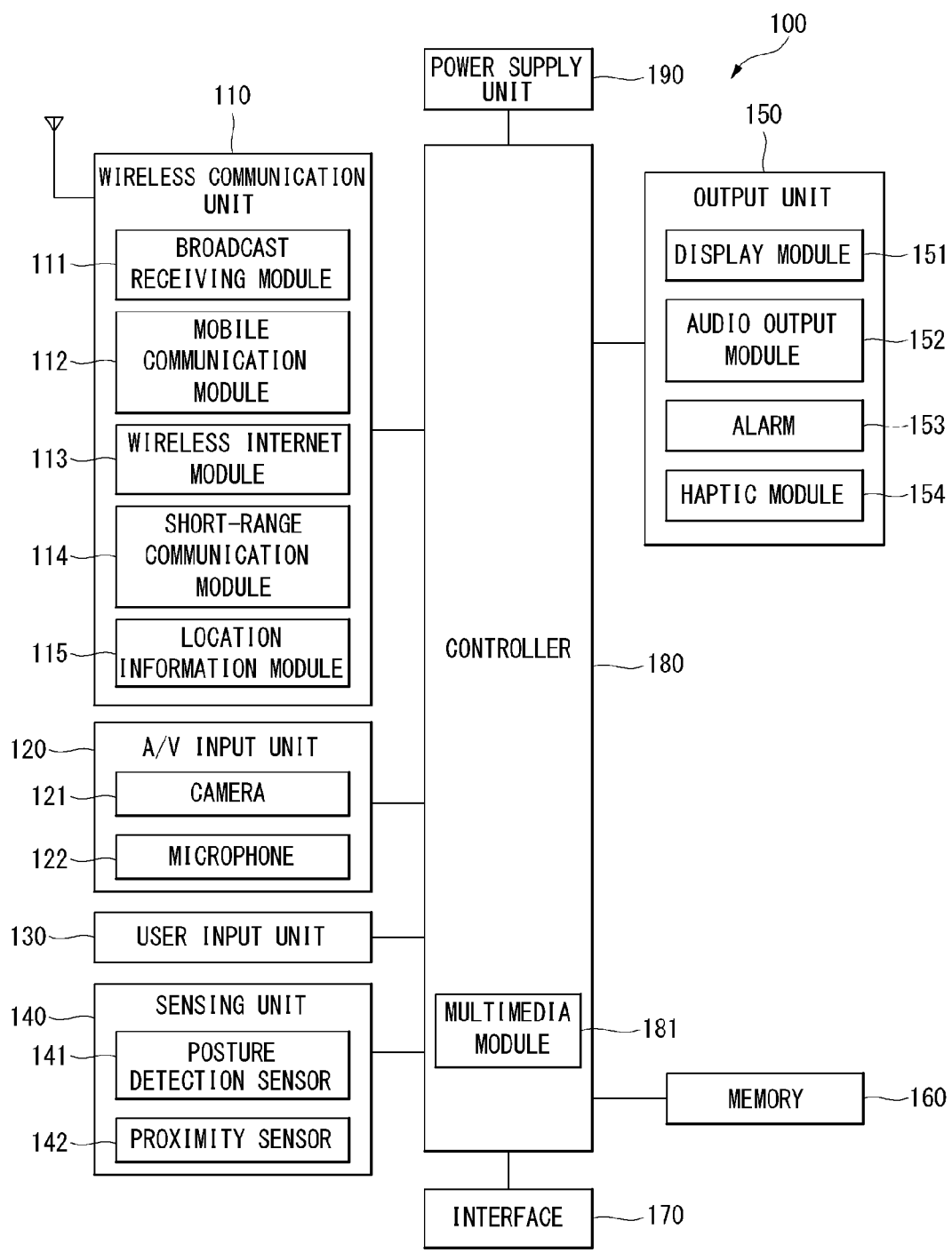
FIG. 1 is a block diagram of an electronic device according to an embodiment of the present invention.

The above and other aspects, features and advantages of the present disclosure will be more apparent from the following detailed description taken in conjunction with the accompanying drawings. As the invention allows for various changes and numerous embodiments, a particular embodiment will be illustrated in the drawings and described in detail in the written description. Like reference numerals refer to like elements throughout the specification. In describing the present disclosure, detailed descriptions of well-known functions or configurations will be omitted in order to not necessarily obscure the subject matter of the present disclosure. Numerals (e.g., first, second, etc.) used in the description of the present invention are only for distinguishing one element from another element.

An electronic device according to the present invention may be described below with reference to the accompanying drawings. In the following description, suffixes "module" and "unit" may be given to components of the electronic device in consideration of only facilitation of description and do not have meanings or functions discriminated from each other.

The electronic device may include a cellular phone, a smart phone, a laptop computer, a digital broadcasting terminal, personal digital assistants (PDA), a portable multimedia player (PMP), a navigation system and/or so on. It should be apparent to those skilled in the art that a configuration according to an embodiment disclosed in this specification should be applicable to fixed or stationary terminals, such as a digital TV or a desktop computer, except for applications disclosed to be specific only to a mobile terminal.

FIG. 1 is a block diagram of an electronic device according to an embodiment of the present invention.

The electronic device 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 are not essential parts and the number of components included in the electronic device 100 can be varied. Components of the electronic device 100 may now be described.

The wireless communication unit 110 may include at least one module that enables radio communication between the electronic device 100 and a radio communication system or between the electronic device 100 and a network in which the electronic device 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal.

The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160.

The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the electronic device 100 or may be externally attached to the electronic device 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZigBee® may be used as a short range communication technique.

The location information module 115 is a module for identifying or otherwise obtaining the location of an electronic device. A global positioning system (GPS) module is a representative example of the location information module 115. According to the current technology, the GPS module 115 may calculate information on distances between one point or object and at least three satellites and information on a time when distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. Additionally, the GPS module 115 may continuously calculate a current position in real time and calculate velocity information using the location or position information.

Referring to FIG. 1, the A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display module 151.

The image frames processed by the camera 121 may be stored in the memory 160 or may be transmitted to an external device through the wireless communication unit 110. The electronic device 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the electronic device 100 from a user. The user input unit 130 may include a keypad, a dome switch, a touch pad (constant voltage/capacitance), a jog wheel, a jog switch and/or so on.

The sensing unit 140 may sense a current state of the electronic device 100, such as an open/close state of the electronic device 100, a position of the electronic device 100, whether a user touches the electronic device 100, a direction of the electronic device 100, and acceleration/deceleration of the electronic device 100, and the sensing unit 140 may generate a sensing signal for controlling operation of the electronic device 100. For example, if the electronic device 100 is a slide phone, the sensing unit 140 may sense whether the slide phone is opened or closed. Further, the sensing unit 140 may sense whether the power supply unit 190 supplies power and/or whether the interface 170 is connected to an external device. Meanwhile, the sensing unit 140 may include a posture sensor 141 and/or a proximity sensor.

The output unit 150 may generate visual, auditory and/or tactile output, and the output unit 150 may include the display module 151, an audio output module 152, an alarm 153 and a haptic module 154. The display module 151 may display information processed by the electronic device 100. The display module 151 may display a user interface (UI) and/or a graphic user interface (GUI) related to a telephone call when the electronic device 100 is in the call mode. The display module 151 may also display a captured and/or received image, a UI or a GUI when the electronic device 100 is in the video telephony mode or the photographing mode.

The display module 151 may include at least one of a liquid crystal display, a thin film transistor liquid crystal display, an organic light-emitting diode display, a flexible display and/or a 3D display. Some of the above displays may be configured as a transparent or light transmissive type display through which the outside may be viewed. This may be called "transparent display".

An example of the transparent display includes a transparent LCD. A rear structure of the display module 151 may also be of a light transmissive type. Accordingly, a user may see an object located behind the body (of the electronic device 100) through the transparent area of the body of the electronic device 100 is occupied by the display module 151.

The electronic device 100 may also include at least two display modules 151. For example, the electronic device 100 may include a plurality of displays 151 that are arranged on a single face at a predetermined distance or integrated displays. The plurality of display modules 151 may also be arranged on different sides.

When the display module 151 and a sensor sensing touch (hereafter, referred to as a touch sensor) form a layered structure (hereinafter, referred to as a touch screen), the display module 151 may be used as an input device in addition to an output device. The touch sensor may be in the form of a touch film, a touch sheet, and/or a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal (signals) corresponding to the touch input may be transmitted to a touch controller. The touch controller may then process the signal(s) and transmit data corresponding to the processed signal(s) to the controller 180. Accordingly, the controller 180 may detect a touched portion of the display module 151.

Referring to FIG. 1, the proximity sensor may be located in an internal region of the electronic device 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the electronic device 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the electronic device 100. The audio output module 152 may include a receiver, a speaker, a buzzer, and/or the like.

The alarm 153 may output a signal for indicating generation of an event of the electronic device 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display module 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The electronic device 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The electronic device 100 may also operate in relation to a web storage that performs a storing function of the memory 160 on the Internet.

The interface 170 may serve as a path to external devices connected to the electronic device 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The user identification module is a chip that stores information for authenticating authority to use the electronic device 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the electronic device 100 through a port.

The interface 170 may also be a path through which power from an external cradle is provided to the electronic device 100 when the electronic device 100 is connected to the external cradle or a path through which various command signals input by the user through the cradle are transmitted to the electronic device 100. The various command signals or power input from the cradle may be used as signals for confirming whether the electronic device 100 is correctly set in the cradle.

The controller 180 may control overall operations of the electronic device 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply unit 190 may receive external power and internal power and provide power required for operations of the components of the electronic device 100 under control of the controller 180. The various embodiments described herein may be implemented as software, hardware, or a combination thereof in a storage medium that may be read by a computer or a similar device thereof.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
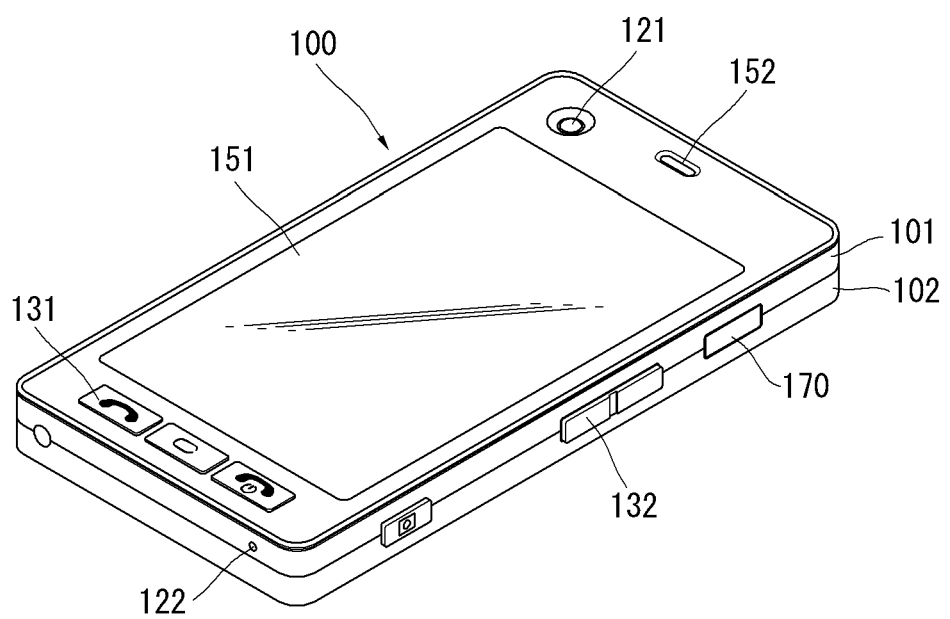
FIG. 2a is a front perspective view of the electronic device according to an embodiment of the present invention.

FIG. 2a is a front perspective view of an electronic device (or a handheld terminal) according to an embodiment of the present invention.

The electronic device 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the electronic device 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display module 151, the audio output unit 152, the camera 121, the user input unit 130/131 and 132, the microphone 122 and the interface 170 may be arranged (or provided) in the terminal body, and more specifically may be arranged (or provided) in the front case 101.

The display module 151 may occupy most of the main face of the front case 101. The audio output unit 152 and the camera 121 may be arranged in a region in proximity to one of both ends of the display module 151 and the user input unit 131, and the microphone 122 may be located in a region in proximity to another end of the display module 151. The user input unit 132 and the interface 170 may be arranged (or provided) on sides of the front case 101 and the rear case 102.

The user input unit 130 may receive commands for controlling operation of the electronic device 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display module 151 to a touch recognition mode.

Figure 2B:
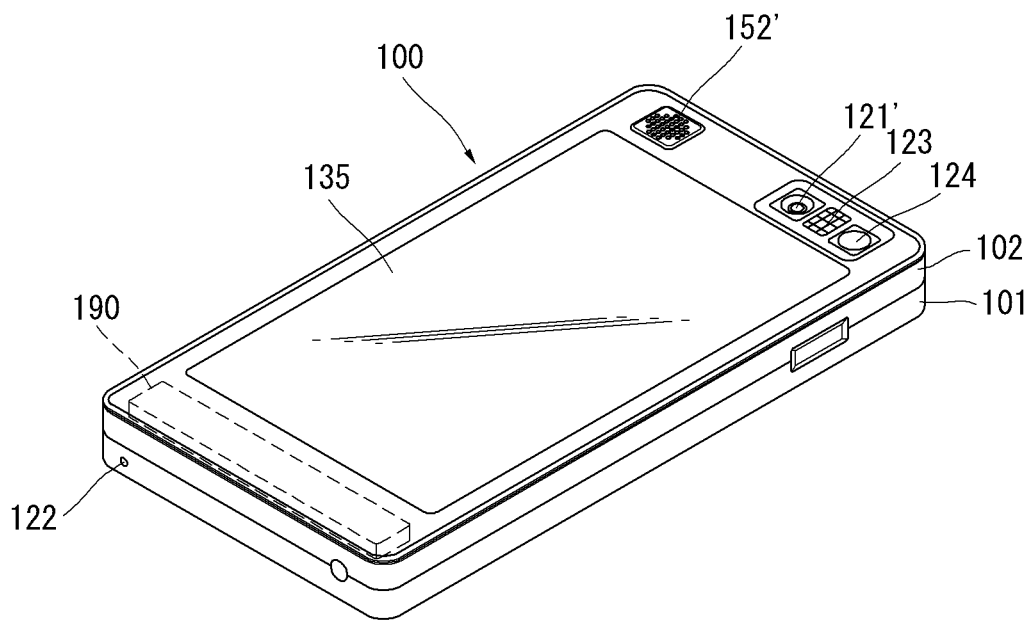
FIG. 2b is a rear perspective view of the electronic device according to an embodiment of the present invention.

FIG. 2b is a rear perspective view of the electronic device shown in FIG. 2a.

Referring to FIG. 2b, a camera 121' may be additionally attached to the rear side of the terminal body (i.e., the rear case 102). The camera 121' may have a photographing direction opposite to that of the camera 121 (shown in FIG. 2a) and may have pixels different from those of the camera 121 (shown in FIG. 2a).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2a) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply unit 190 for providing power to the electronic device 100 may be set in the terminal body. The power supply unit 190 may be included in the terminal body or may be detachably attached to the terminal body.

A touch pad 135 for sensing touch may be attached to the rear case 102. The touch pad 135 may be of a light transmission type, such as the display module 151. In this example, if the display module 151 outputs visual information through both sides thereof, the visual information may be recognized (or determined) by the touch pad 135. The information output through both sides of the display module 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display module 151 of the front case 101. The touch pad 135 may be located in parallel with the display module 151 behind the display module 151. The touch pad 135 may be identical to or smaller than the display module 151 in size.

Figure 2C:
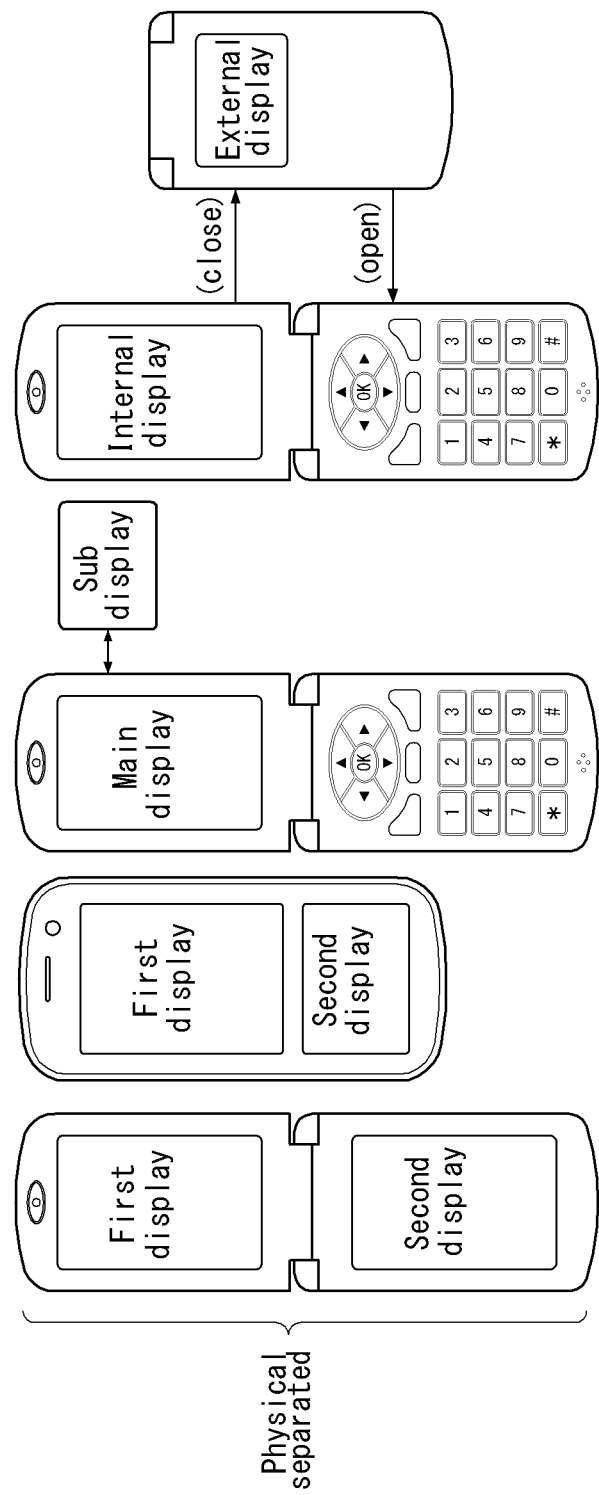
FIGS. 2c and 2d illustrate forms of the electronic device and display screens according to various embodiments of the present invention.
Figure 2D:
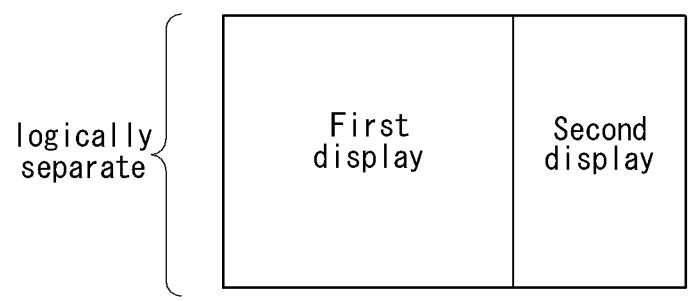

FIGS. 2c and 2d illustrate the electronic device 100 and the display module 151 according to various embodiments.

Referring to FIG. 2c, the display module 151 may include a first display and a second display that are physically separated from each other. In a folder type or slide type electronic device having two bodies connected through a hinge or a slide, the first display (or main display) may be formed on the inner face or outer face of one of the bodies, and the second display (or sub display) may be formed on the inner face or outer face of the other body. The sub display may be separated from the electronic device and may be detachably combined with the electronic device body through an interface to display data from the electronic device 100.

The display module 151 may include first and second displays that may be logically separated from each other in a display panel, as shown in FIG. 2d.

Figure 3:
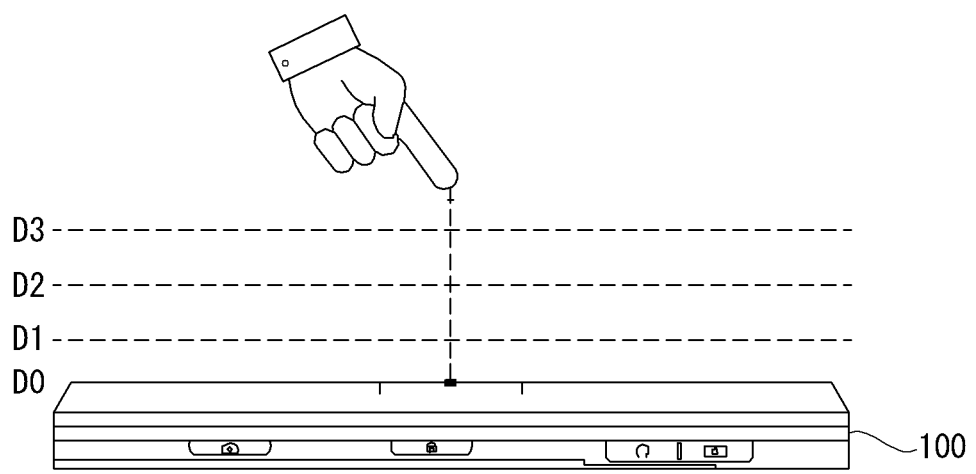
FIG. 3 is a view for explaining a proximity depth of a proximity sensor.

FIG. 3 is a view for explaining a proximity depth of a proximity sensor.

As shown in FIG. 3, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 3 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (d0), it may be recognized as contact touch. When the pointer is located within a distance d1 from the touch screen, it may be recognized as a proximity touch of a first proximity depth. When the pointer is located in a range between the distance d1 and a distance d2 from the touch screen, it may be recognized as a proximity touch of a second proximity depth. When the pointer is located in a range between the distance d2 and a distance d3 from the touch screen, it may be recognized as a proximity touch of a third proximity depth. When the pointer is located greater than the distance d3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Figure 4:
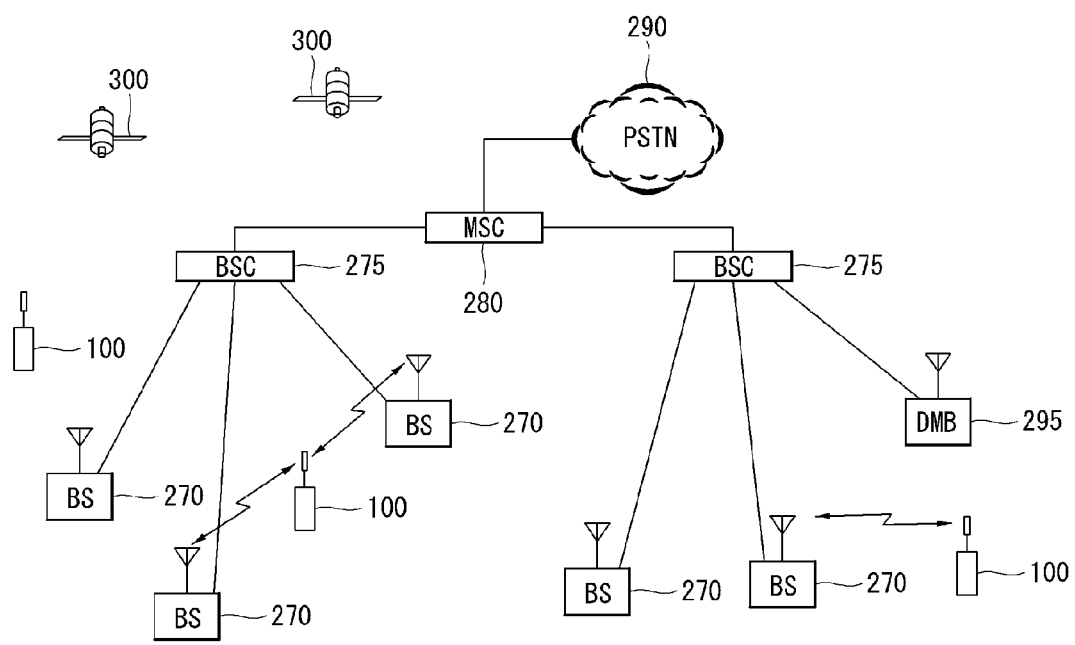
FIG. 4 illustrates a configuration of a CDMA wireless communication system communicating with the electronic device shown in FIG. 1.

Referring to FIG. 4, a CDMA wireless communication system includes electronic devices 100, base stations 270, base station controllers 275, and a mobile switching center 280. The mobile switching center 280 is connected to a public switch telephone network (PSTN) 290. The mobile switching center 280 is connected to the base station controllers 275. The base station controllers 275 are connected to the base stations 270 through backhaul lines. The backhaul lines may be constructed according to E1/T1, ATM, IP, PPP, frame relay, HDSL, ADSL or xDSL well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 is constructed to have frequency assignments, and the frequency assignments may have specific spectra (for example, 1.25 MHz and 5 MHz).

Intersection of sectors and frequency assignments may be referred to a CDMA channel.

The base stations 270 may be referred to as base station transceiver subsystems (BTSs). "Base station" may be used as a term that collectively designates the base station controller 275 and one or more base stations 270 in several examples. Furthermore, the base stations 270 may be referred to as "cell sites". Otherwise, individual sectors of a given base station 270 may be referred to as cell sites.

A terrestrial DMB transmitter 295 can transmit broadcasting signals to the electronic devices 100 operating in the CDMA wireless communication system. The broadcasting receiving module 111 of each electronic device 100 is constructed to receive the broadcasting signals transmitted from the DMB transmitter 295. This can be similarly applied to different types of broadcast and multicast signaling as described above.

FIG. 4 illustrates global positioning system (GPS) satellites 300. These satellites 300 can track the positions of some or all of the electronic devices 100. Although two satellites are shown in FIG. 4, position information can be obtained from less than or more than two satellites. In addition, other position-tracking techniques (for example, position-tracking techniques that can substitute for GPS technique or can be added to the GPS technique) can be used. If required, some or all of the GPS satellites 300 can support satellite DMB transmission separately or additionally.

When the CDMA wireless communication system operates, the base stations 270 receive reverse link signals from the electronic devices 100. The electronic devices 100 may be in a state that the electronic devices 100 are making calls, sending messages or performing other communications. The reverse link signals received by the base stations 270 are processed by the base stations 270. The processed data is transmitted to the base station controllers 275 connected to the base stations 270. The base station controllers 275 provide call resource allocation and mobility management functionality including soft handoffs between the base stations 270. Furthermore, the base station controllers 275 transmit the received data to the mobile switching center 280. The mobile switching center 280 provides additional routing services for interfacing with the PSTN 290. Similarly, the PSTN 290 interfaces with the mobile switching center 280, and the mobile switching center 280 interfaces with the base station controllers 275. The base station controllers 275 sequentially control the base stations 270 to transmit forward link signals to the electronic devices 100.

Hereinafter, the embodiments of the present invention will be described. In the present invention, the display module 151 is defined as a touch screen 151 for the convenience of description. As described above, the touch screen 151 may perform both a function of displaying information and a function of inputting information. However, it is apparently emphasized that the prevent invention is not limited thereto. The term "touch", to be mentioned later, is construed to mean both a contact touch and a proximity touch.

Figure 5:
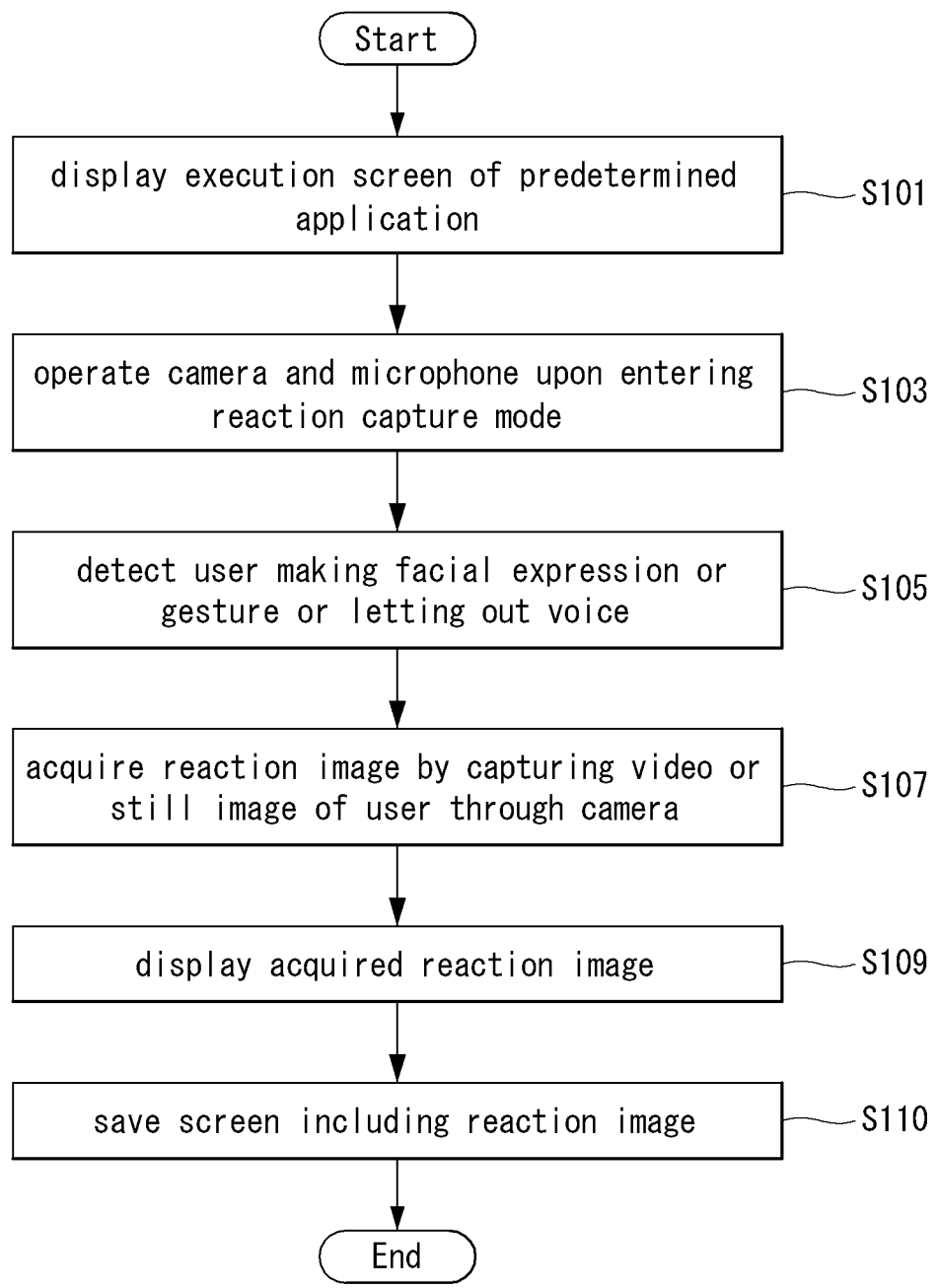
FIG. 5 is a flowchart of a control method of an electronic device according to a first embodiment of the present invention.

FIG. 5 is a flowchart of a control method of an electronic device according to a first embodiment of the present invention.

When the execution screen (e.g., video playback screen) of a predetermined application is displayed on the touch screen 151, the electronic device 100 according to the embodiment of the present invention may operate in reaction capture mode for capturing an image of a user seeing the touch screen 151 by operating the camera and the microphone.

That is, upon detecting a reaction such as a user gesture while capturing the user watching a video by operating the camera and the microphone, the controller may operate in reaction capture mode that captures an image of the user and displays the captured image on the touch screen.

When the user who is watching a video or reading a webpage makes a facial expression or gesture or lets out a voice, the electronic device 100 according to the embodiment of the present invention may display and save the user's image, together with the touch screen image of the detected user reaction. Accordingly, the user reaction to the video or the webpage can be shared with other people.

A control method of an electronic device according to an embodiment of the present invention will be described below.

The controller 180 may display the execution screen of a predetermined application on the touch screen 151 (S101).

The execution screen of the predetermined application may include at least one of the following: the playback screen of a video application, the execution screen of an SNS (social networking service), the execution screen of a messaging application, and the screen of a webpage. For example, the execution of the predetermined application may be a screen that plays a video of a sports event, a music video, and so on.

When the controller 180 enters reaction capture mode, it may operate the camera and the microphone (S103).

The controller 180 may operate in reaction capture mode based on the input of a predetermined control signal. The predetermined control signal may be preset in the electronic device 100, or set by user input.

If a predetermined condition preset in the electronic device 100 is satisfied, the controller 180 may automatically operate in reaction capture mode.

When the controller 180 enters reaction capture mode, it may operate the camera 121 and the microphone 122. That is, the controller 180 can capture the user seeing the touch screen 151 through the camera 121. The controller 180 can acquire the user's voice through the microphone 122.

The controller 180 may detect the user making a facial expression or gesture or letting out a voice (S105). That is, the controller 180 may detect the user's facial expression or gesture through the camera 121. Also, the controller 180 may detect the user's voice through the microphone 122.

For example, the controller 180 may detect a facial expression, such as a surprised look or smile on the face of the user watching a music video, and a voice, such as the sound of the user's laughing.

The controller 180 may acquire a reaction image by capturing a video or still image of the user through the camera (S107).

If the user's facial expression or gesture is detected for a predetermined time or more, the controller 180 may acquire a reaction image as a video.

Also, if the user's voice is detected through the camera 121 for the predetermined time or more, the controller 180 may acquire a reaction image as a video.

Also, if the user's facial expression, gesture, or voice is detected through the microphone 122 for less than the predetermined time, the controller 180 may acquire the reaction image as a still image.

The predetermine time may be preset in the electronic device 100 or reset by user input.

For example, if the user's smile lasts for not less than 5 seconds, the controller 180 may capture a video of the user and save it. Otherwise if the user's smile lasts for less than 5 seconds, the controller 180 may capture a still image of the user and save it.

The controller 180 may display the acquired reaction image on the touch screen (S109). This means that the controller 180 can display the user's image on the touch screen 151 as soon as it detects the user's reaction through the camera 121.

The controller 180 may display the acquired reaction image in an overlapping way on the execution screen (e.g., video playback screen) of a predetermined application displayed on the touch screen.

The controller 180 may save the screen including the reaction image (S110).

For example, the controller 180 may save as a single file the playback screen of a music video where the user's reaction image is displayed.

FIGS. 6 to 13 are views showing an example of the touch screen where a captured reaction image of a user is displayed.

The user reaction may involve putting a smile or surprised look on the user's face, putting their hands up, a gesture, laughing loud, a shouted voice, and so on.

Figure 6:
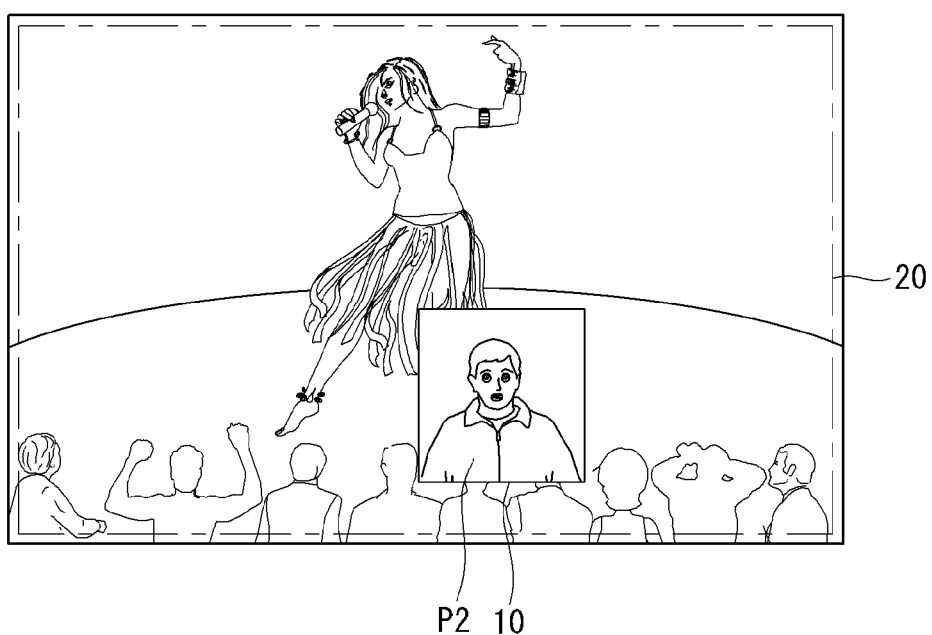

As shown in FIG. 6, a captured image 10 of a user P2 may be displayed in an overlapping way on the video playback screen 20 of the touch screen 151.

For example, when a video of a performance by a singer is playing on the touch screen 151, the captured image 10 of the user P2 with a surprised look may be displayed on the touch screen 151.

The controller 180 may display an image of the user, which is captured based on a facial expression of the user P2, such as a surprised look or smile, on the touch screen the moment it detects the facial expression.

That is, an image including a reaction from the user watching the video of a performance by a singer can be shared with other users by displaying the user reaction on the touch screen and saving it.

As shown in FIG. 7, upon detecting a reaction from a user P3, the controller 180 may display a captured image of the user to a larger size 12 in the center of the touch screen 151 and then display it to a smaller size 13 in the lower portion of the touch screen 151.

As shown in (a) of FIG. 7, the controller 180 may display a captured image 12 of the user to a size not smaller than a certain size in the center of the touch screen 151 the moment it detects a facial expression of the user P3.

For example, the controller 180 may display the captured image 12 of the user P3 in the center of the touch screen 151 for a predetermined time (e.g., 2 seconds) the moment it detects a facial expression of the user P3. This increases the sense of immediacy, which allows for immediate recognition of a detected user reaction at the time of playback of a video (e.g., of a performance by a singer).

As shown in (b) of FIG. 7, the controller 180 may display the captured image 12 of the user displayed in (a) of FIG. 7 to a smaller size in the lower portion of the touch screen 151.

That is, the controller 180 can display 13 the image 12 of (a) of FIG. 7 in such a way that the image is reduced and moved to the lower portion of the touch screen 151.

Therefore, an image of the user may be displayed in a larger size on the touch screen 151 as soon as a user reaction is detected, thereby achieving immediacy and giving expression to the user's emotions. At the same time, the image may be displayed in such a way that it is reduced and moved to the lower portion of the touch screen 151 to prevent the image from blocking the screen 20 of a running playback video as far as possible.

FIG. 8 illustrates an example where a predetermined animation effect is added for intuitive recognition when a reaction image 14 of a user P4 is displayed on the touch screen 151, as shown in FIG. 7.

As shown in (a) of FIG. 8, upon detecting a user reaction, the controller 180 may add a mark near the captured image 14 of the user to highlight the image 14. For example, the controller 180 may put a frame mark a1 near the image 14. Also, the controller 180 may add animation effects such as making the image 14 flicker, enlarging the image 14, and changing the color, shade, etc of the image 14.

Accordingly, the moment when a user reaction is detected can be recognized more intuitively.

(b) of 8 illustrates an example where the reaction image 14 of (a) of FIG. 8 is displayed in such a way that it is reduced and moved to the lower portion of the touch screen 151, as shown in (b) of FIG. 7.

FIG. 9 illustrates an example where the display position of a reaction image is changed.

As shown in (a) of FIG. 9, upon detecting a reaction from a user P5, the controller 180 may display a captured image 16 of the user P5 on the execution screen 20 of the touch screen 151.

Upon receiving an input (e.g., long touch and drag) for choosing the image 16 with a finger F1 or the like and moving it, the controller 180 may change the display position of the image 16. That is, the user may move the reaction image 16 to be displayed at a desired position of the touch screen 151.

FIG. 10 illustrates an example where the size of a reaction image is changed.

As shown in (a) of FIG. 10, the controller 180 may receive an input for choosing a reaction image 17 of a user P6 displayed on the video playback screen 20 with two fingers F2 and F3 and enlarging it in the directions of arrows.

As shown in (b) of FIG. 10, the controller 180 may display an enlarged reaction image 18 on the touch screen 151 based on input signals F2 and F3 from the user.

That is, the user can adjust the size of the reaction image displayed on the touch screen 151 by enlarging or reducing it.

Figure 11:
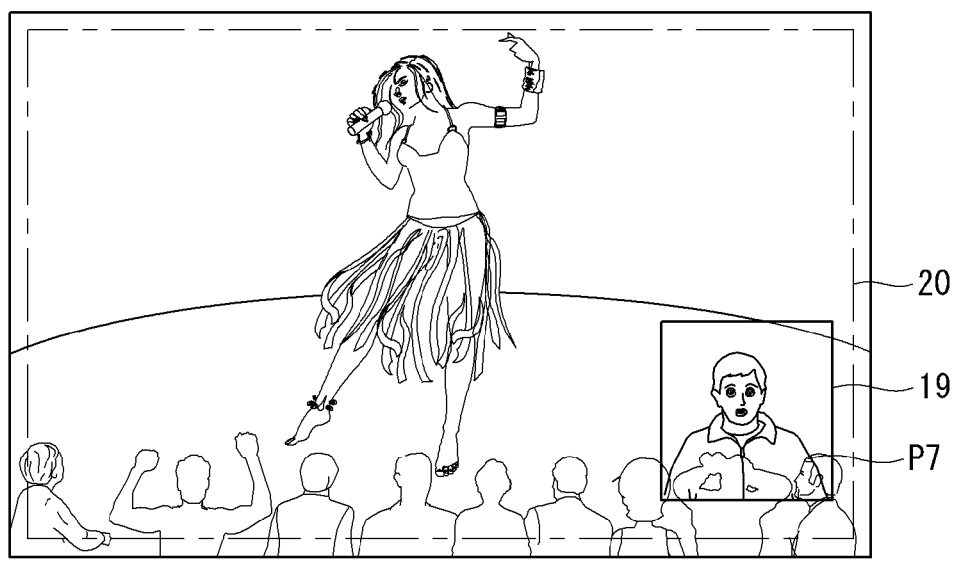

FIG. 11 illustrates an example where a reaction image is displayed transparent.

As shown in FIG. 11, the controller 180 may display a captured reaction image 19 of a user P7 in transparent form on the video playback screen 20. That is, the controller 180 may display the reaction image 19 in an overlapping manner on the video playback screen 20 in such a way as to display the video playback screen 20 as well even in the overlapping area.

The controller 180 may adjust the transparency of the reaction image 19.

The controller 180 may adjust the transparency of the reaction image 19 displayed based on an input signal from the user, that is, how much of the video 20 is seen in the display area of the reaction image 19.

Also, if a preset condition is satisfied, such as a user reaction lasting for a predetermined time or more or the user showing a reaction to some extent or more, the controller 180 may automatically change the transparency of the displayed reaction image.

FIG. 12 illustrates an example where a reaction image is displayed in full on the touch screen 151.

As shown in (a) of FIG. 12, the controller 180 may display the playback screen 20 of a video in full on the touch screen 151 and display a captured reaction image 41 of the user P16 in a region of the lower portion of the video playback screen 41.

The controller 180 may receive a predetermined input signal such as an input for doing a long touch on the video playback screen 20 with a finger F6.

As shown in (b) of FIG. 12, the controller 180 may stretch the reaction image 41 of the user P16 for full-screen display on the touch screen 151 based on the input signal F6.

That is, the controller 180 may display the reaction image in full on the touch screen 151 and display a currently playing video 43 in a region of the screen of the reaction image 42.

Figure 13:
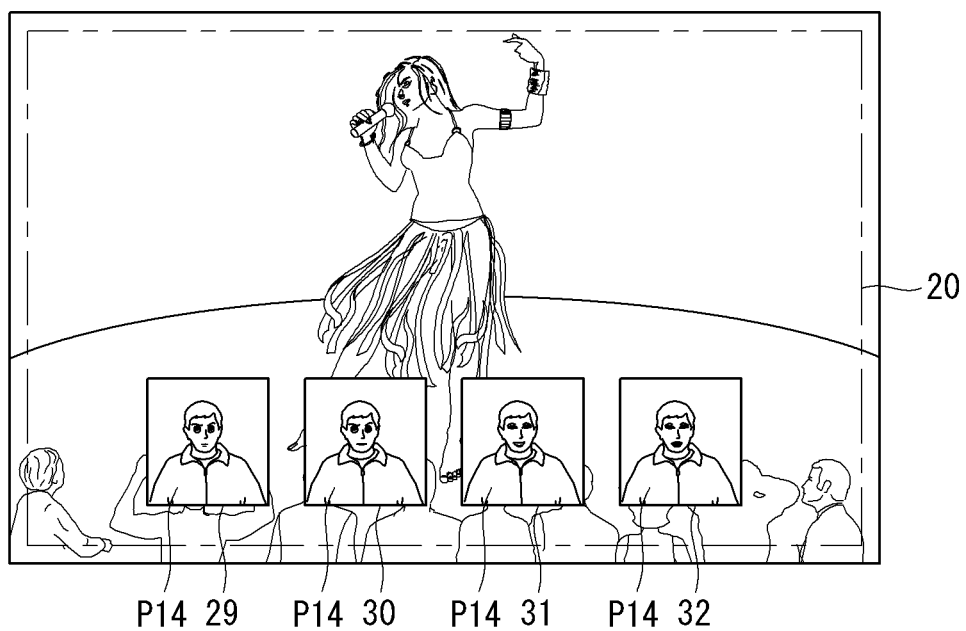

FIG. 13 illustrates an example where the user is continuously captured and displayed on the touch screen.

As shown in FIG. 13, the controller 180 may continuously capture images of the user P14 a plurality of times through the camera 121. That is, the controller 180 may display a plurality of images 29, 30, 31, and 32 of the user P14 on the video playback screen 20.

If a predetermined condition for continuous capture is satisfied, the controller 180 may display the images continuously captured a plurality of times or for a predetermined time on the touch screen.

For example, the predetermined condition for continuous capture may be that a preset input signal is received from the user. Otherwise, the predetermined condition for continuous capture may be that a user reaction lasts for a predetermined time or more.

By displaying a plurality of continuously captured images of the user on the touch screen, the user's facial expression, gesture, etc can be intuitively recognized.

Figure 14:
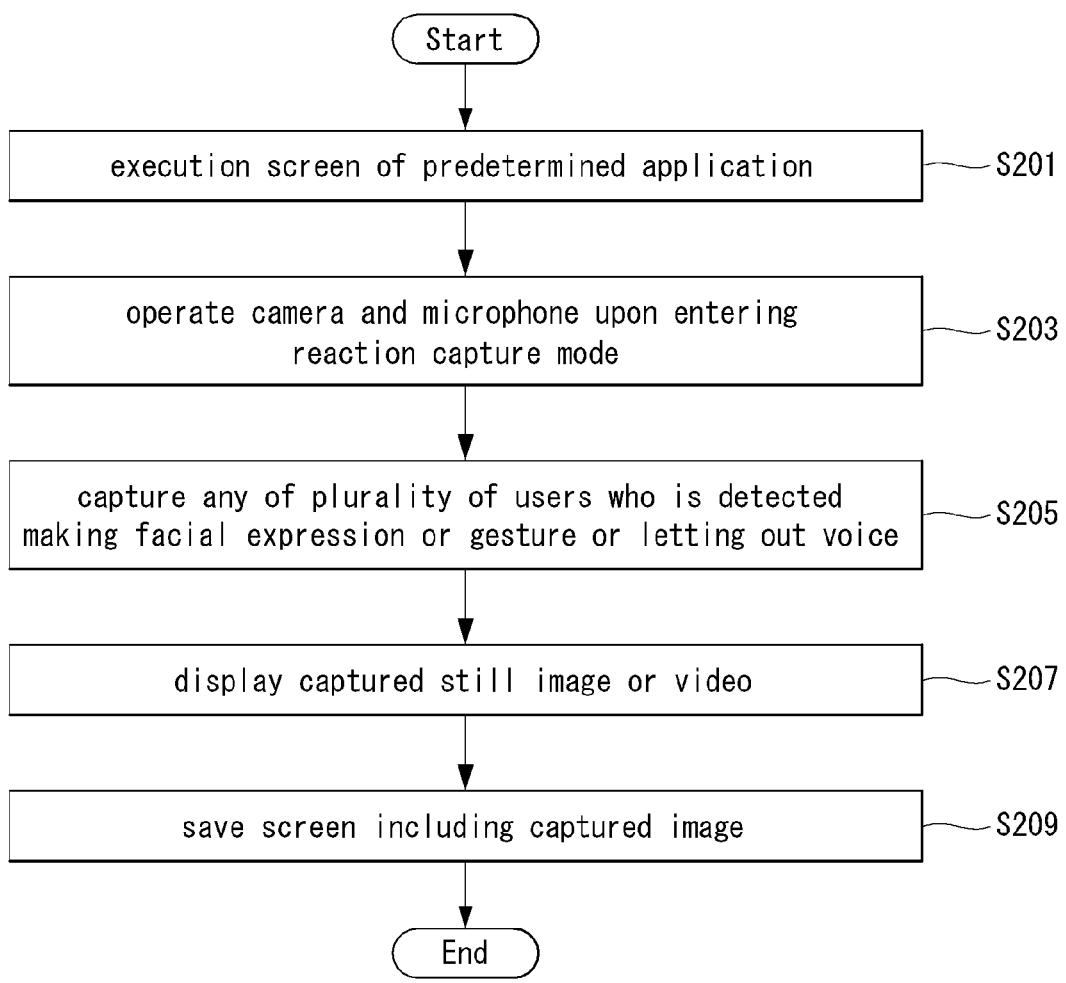
FIG. 14 is a flowchart of a control method of an electronic device according to a second embodiment of the present invention.

FIG. 14 is a flowchart of a control method of an electronic device according to a second embodiment of the present invention. FIG. 14 illustrates an example where a plurality of users who are seeing the touch screen 151 of an electronic device 100 are captured.

The controller 180 may display the execution screen of a predetermined application on the touch screen 151 (S201).

When the controller 180 enters reaction capture mode, it may operate the camera 121 and the microphone 122 (S203).

That is, the controller 180 may display a performance video on the touch screen 151 and go into reaction capture mode for capturing users seeing the touch screen 151.

The steps S201 and S203 may be described with reference to the detailed description of FIG. 5.

The controller 180 may capture any one of the plurality of users who is detected making a facial expression or gesture or letting out a voice (S205). The controller 180 may display a captured still image or video on the touch screen 151 (S207).

That is, when a plurality of users are seeing the touch screen 151, the controller 180 may capture any one of the users who is detected making a predetermined reaction, and display him or her on the touch screen 151.

Upon simultaneously detecting a plurality of users making reactions, the controller 180 may capture images of the plurality of users who are detected making reactions as individual still images or individual videos, and capture them on the touch screen 151.

Moreover, when any one of the plurality of users is detected making a reaction, the controller 180 may capture the plurality of users altogether as a single still image or single video and display it on the touch screen 151.

The controller 180 may save the screen including the captured image (S209). The controller 180 may save the screen including the captured image of the plurality of users as a single file.

Figure 15:
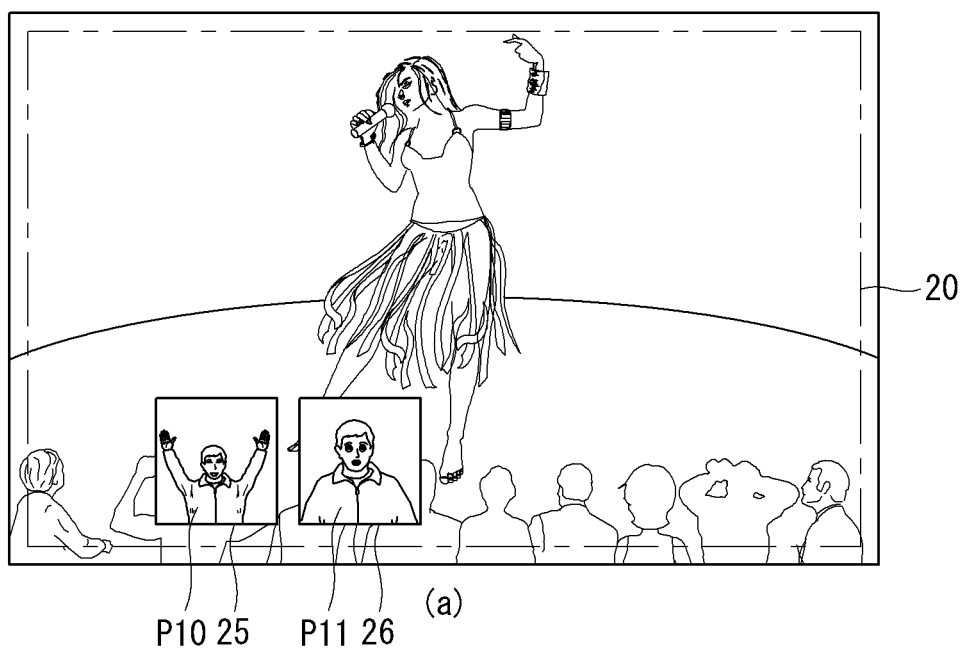
FIGS. 15 and 16 are views showing an example of the touch screen where a captured reaction image of a plurality of users is displayed.
Figure 16:
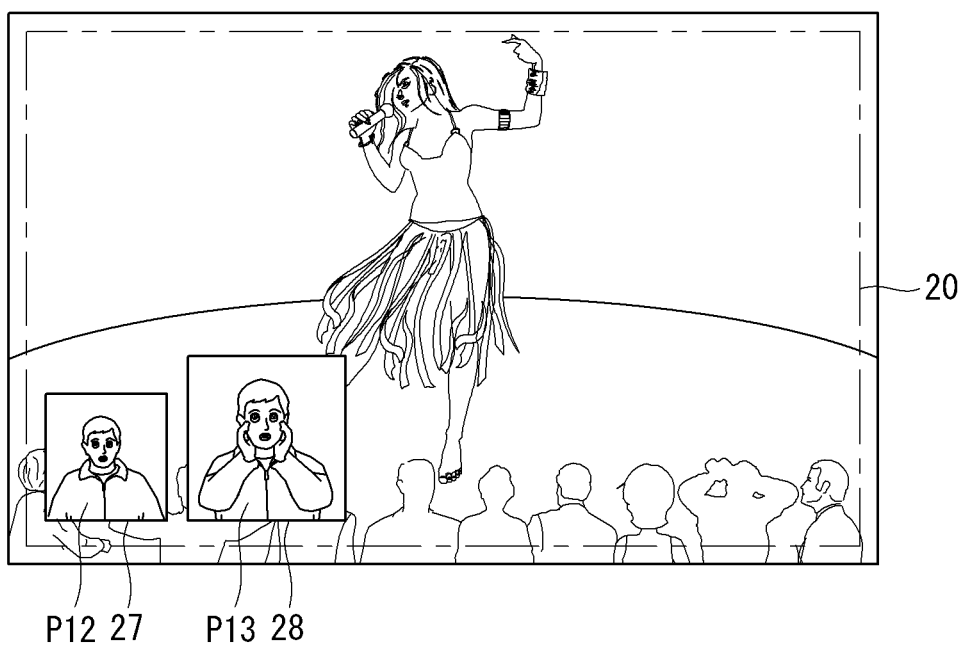

FIGS. 15 and 16 are views showing an example of the touch screen where a captured reaction image of a plurality of users is displayed.

As shown in FIG. 15, the controller 180 may display individual captured images 25 and 26 of a first user P10 and a second user P11 on the touch screen 151.

That is, when a plurality of users are seeing the touch screen 151, the controller 180 may capture some of the plurality of users who are detected making a reaction, and display their images on the touch screen 151.

For example, if a gesture of the first user P10 lasts for a predetermined time or more, the controller 180 may capture an image of the first user P10 as a video 25 and display it on the touch screen 151. If a facial expression of the second user P11 lasts for the predetermined time, the controller 180 may capture an image of the second user P11 as a still image 26 and display it on the touch screen 151.

Moreover, the controller 180 may capture the first user P10 and the second user P11 altogether as a single video or single still image and display it on the touch screen 151.

FIG. 16 illustrates an example where some of a plurality of users showing a big reaction are highlighted and displayed.

For example, upon detecting a first user P12 making a facial expression and a second user P13 making a facial expression and a gesture, the controller 180 may display a captured image 28 of the second user P13 at a larger size than a captured image 27 of the first user P12. That is, if multiple reactions are detected during the recognition of facial expressions, gestures, or voices, the controller 180 may recognize that a big reaction is occurring.

Figure 17:
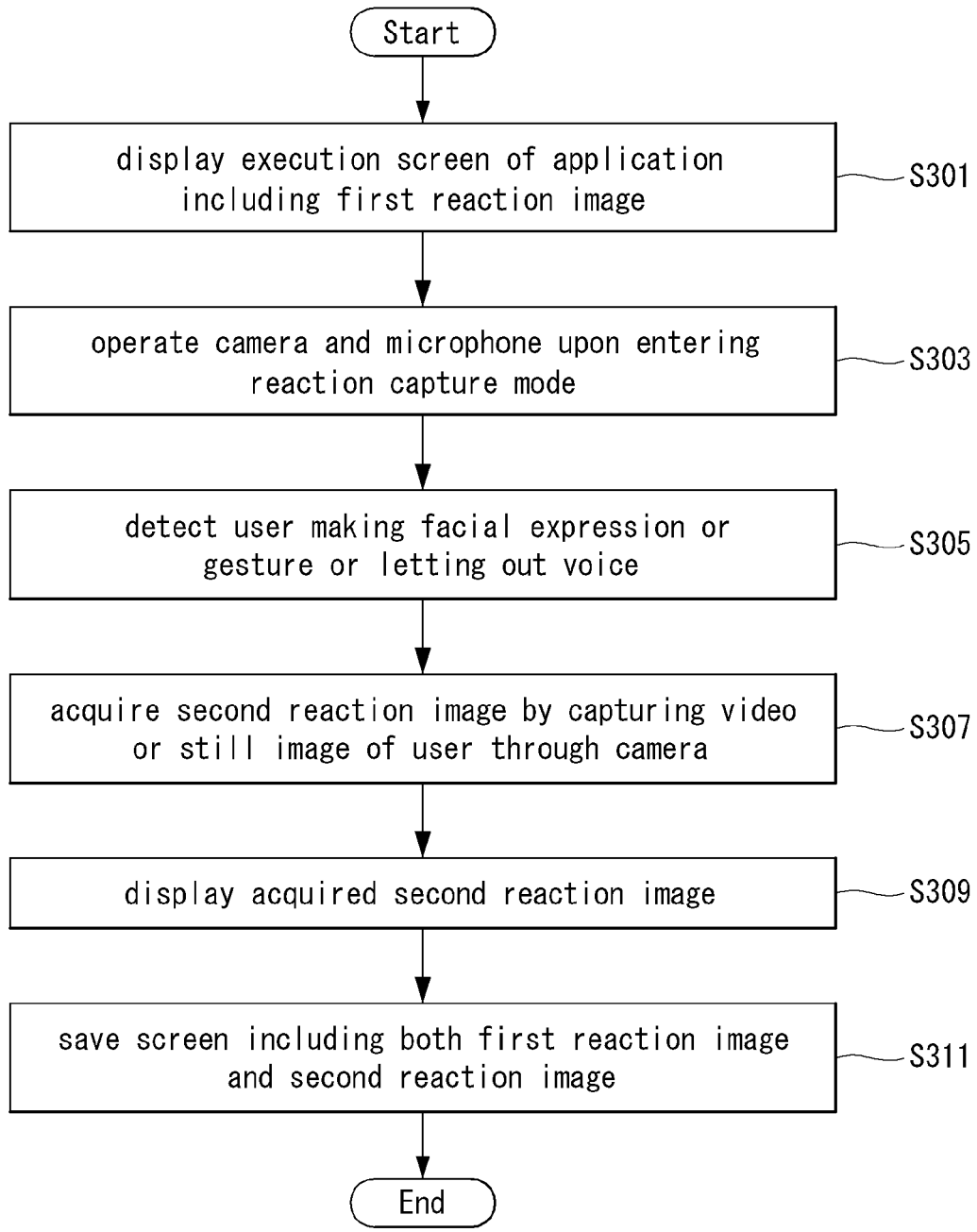
FIG. 17 is a flowchart of a control method of an electronic device according to a third embodiment of the present invention.

FIG. 17 is a flowchart of a control method of an electronic device according to a third embodiment of the present invention. FIG. 17 illustrates an example where a second reaction image is also captured and displayed when a video with a first reaction image displayed and saved in it is displayed.

The controller 180 may display the execution screen of an application including a first reaction image (S301).

When the execution screen with the first reaction image displayed and saved in it is playing on the touch screen 151, the controller 180 may capture a second reaction image of the user, and display and save it, along with the first reaction image.

This means that reaction images of other users can be displayed in combination with a video with a reaction image already captured and saved in it.

When the controller 180 enters reaction capture mode, it may operate the camera and the microphone (S303). The controller 180 may detect the user making a facial expression or gesture or letting out a voice (S305). The controller 180 may acquire a second reaction image by capturing a video or still image of the user through the camera 121 (S307).

The steps S303, S305, and S307 may be described with reference to the detailed description of FIG. 5.

The controller 180 may display the acquired second reaction image on the touch screen 151 (S309). The controller 180 may save the screen including both the first reaction image and the second reaction image (S311).

That is, the controller 180 may display the acquired second reaction image as well on the screen displaying the first reaction image.

Accordingly, even when a plurality of users are playing and watching a video at different points in time, reaction images of the users can be acquired, combined, and shared.

FIG. 18 is a view for explaining the third embodiment of the present invention.

FIG. 18 illustrates an example where a second reaction image 23 is captured when a video playback screen 20 with a first reaction image displayed and saved in it is playing on the touch screen 151.

As shown in (a) of FIG. 18, when the video 20 including the first reaction image 22 of a user P8 is playing on the touch screen 151, the controller 180 may capture a second reaction image 23 of a user P9 and display it on the touch screen 151.

That is, upon detecting a reaction from the user P9, the controller 180 may capture the second reaction image 23 and display it in the center of the touch screen 151.

As shown in (b) of FIG. 18, the controller 180 may display 24 the second reaction image 23 in such a way that it is reduced and moved to the lower portion of the touch screen 151.

The second reaction image 23 and 24 may be a video or a still image depending on the duration of the reaction from the user P9.

The second reaction image 23 may be displayed in the same size as the first reaction image 22 which is already displayed.

Moreover, the second reaction image 23 may be displayed to occupy a larger or smaller proportion of the touch screen 151 than the first reaction image 22 depending on the extent of the reaction. For example, if multiple reactions are detected during the recognition of facial expressions, gestures, or voices, the controller 180 may recognize that a big reaction is occurring.

FIG. 19 is a view for explaining a fourth embodiment of the present invention.

As shown in FIG. 19, the controller 180 may display reaction images 33, 34, 35, 36, 37, 38, and 39 on the video playback screen 20 by continuously capturing a user P15 a plurality of times. The reaction images 33, 34, 35, 36, 37, 38, and 39 may be displayed in thumbnail form.

As shown in (a) of FIG. 1, the controller 180 may receive a touch input for choosing any one of the reaction images 33, 34, 35, 36, 37, 38, and 39 displayed in thumbnail form with a finger F5.

As shown in (b) of FIG. 1, the controller 180 may allow the reaction image 36 to jump to a point in time in the video when the reaction image 36 is captured and display the video, based on the input for choosing the thumbnail reaction image 36.

That is, continuously captured reaction images may serve as indices which indicate the points in time when the individual reaction images are captured. Accordingly, when any one of the thumbnail reaction images is chosen, the video may start to play at the playback position in the video where the chosen reaction image is captured.

FIG. 20 is a view showing an example where a file of a captured reaction image is saved and managed according to the present invention.

The electronic device 100 according to one embodiment of the present invention may capture a reaction from a user seeing the touch screen 151 while a video file is playing, and display and save it on the video playback screen.

When the video file with the reaction image displayed and saved in it is playing, the electronic device 100 may capture a reaction from a user seeing the touch screen 151, and display and save it on the video playback screen. That is, this means that an additional reaction image can be combined with a single video file.

The electronic device 100 according to the embodiment of the present invention may save a plurality of files including reaction images in the memory 160. The plurality of files including reaction images may be classified according to individuals (users) with reactions.

As shown in (a) and (b) of FIG. 20, first, second, and third files 51, 52, and 53 including captured images of John P20 and fourth, fifth, sixth, and seventh files including captured images of Tom P21 may be classified and saved in separate folders.

FIG. 21 is a view showing an example of a touch screen which displays a reaction image on the screen of a webpage.

The electronic device 100 according to one embodiment of the present invention may display a predetermined webpage 70 on the touch screen 151, and capture a reaction from a user seeing the touch screen 151 and display it on the touch screen 151.

For example, upon detecting a facial expression, gesture, or voice of the user who is reading the text of the webpage, the controller 180 may captured an image of the user and display it on the webpage 70 of the touch screen 151.

FIG. 22 is a view showing an example of a touch screen which displays a reaction image on the execution screen of an SNS.

The electronic device 100 according to one embodiment of the present invention may display the execution screen 80 of an SNS (social networking service) on the touch screen 151, and display a captured image of the user seeing the touch screen 151 on the execution screen 80 of the SNS.

As shown in (a) of FIG. 22, a captured image 61 of the user may be displayed in the comment entry field 81 of the execution screen 80 of the SNS. Also, an emoticon 62 that looks similar to the user's expression included in the captured image may be displayed in the comment entry field of the execution screen 80 of the SNS.

The controller 180 may receive a touch input for choosing at least either the image 61 or emoticon 62 displayed in the comment entry field 81 with a finger F11. For example, upon receiving an input for choosing the image 61 displayed in the comment entry field 81, the controller 180 display the chosen image 61 as a comment ((b) of FIG. 22).

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

An electronic device may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a electronic device that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a touch screen;
a camera;
a microphone; and
a controller configured to:
   display at least one execution screen of an application on the touch screen,
   control the camera and the microphone to operate upon entering a reaction capture mode,
   acquire a reaction image by capturing a video or still image of a user through the camera upon detecting at least one of the user making a facial expression or gesture through the camera or the user's voice through the microphone, and
   display the acquired reaction image on the touch screen,
   wherein the controller is further configured to:
      display the acquired reaction image in thumbnail form on the touch screen, and
      upon receiving an input for choosing one of reaction images displayed in thumbnail form, display on the touch screen a particular execution screen of the application corresponding to a point in time when the chosen reaction image is acquired.

2. The electronic device of claim 1, wherein the at least one execution screen of the application comprises at least one of:
an execution screen of a video application,
an execution screen of an SNS (social networking service),
an execution screen of a messaging application, or
a screen of a webpage.

3. The electronic device of claim 1, wherein, if the user's facial expression or gesture is detected through the camera for a predetermined time or more, or the user's voice is detected through the microphone for the predetermined time or more, the controller acquires the reaction image as a video, and if the user's facial expression, gesture, or voice is detected for less than the predetermined time, the controller acquires the reaction image as a still image.

4. The electronic device of claim 1, wherein the controller displays the acquired reaction image in an overlapping way on a corresponding execution screen of the application.

5. The electronic device of claim 4, further comprising a memory, and wherein the controller saves data corresponding to an image of the corresponding execution screen of the application displaying the acquired reaction image as a single file in the memory.

6. The electronic device of claim 1, wherein, upon detecting a plurality of users through the camera, the controller acquires a captured reaction image of any one of the plurality of users who is detected at least one of making a facial expression or gesture or letting out a voice.

7. The electronic device of claim 1, wherein, if at least either the detected facial expression, gesture, or voice satisfies a predetermined condition, the controller changes at least one of a size, a display position, or a transparency of the reaction image.

8. The electronic device of claim 1, wherein the controller changes at least one of the size, display position, and transparency of the reaction image, based on a particular input from the user.

9. The electronic device of claim 1, wherein the controller causes multiple still images of the user to be captured through the camera.

10. A control method of an electronic device, the method comprising:
displaying at least one execution screen of an application on the touch screen;
controlling the camera and the microphone to operate upon entering a reaction capture mode;
detecting, during the reaction capture mode, at least one of a user making a facial expression or gesture through a camera or the user's voice through a microphone;
acquiring, based on detecting the user making a facial expression or gesture through the camera or the user's voice through the microphone, a reaction image by capturing a video or still image of the user through the camera;
displaying the acquired reaction image on the touch screen, wherein the acquired reaction image is displayed in a thumbnail form on the touch screen; and
upon receiving an input for choosing one of reaction images displayed in thumbnail form, displaying on the touch screen a particular execution screen of the application corresponding to a point in time when the chosen reaction image is acquired.

11. The control method of claim 10, wherein the at least one execution screen of the predetermined application includes at least one of:
an execution screen of a video application,
an execution screen of an SNS (social networking service),
an execution screen of a messaging application, or
a screen of a webpage.

12. The control method of claim 10, wherein displaying the acquired reaction image on the touch screen includes:
displaying the acquired reaction image in an overlapping way on a corresponding execution screen of the application.

13. The control method of claim 10, wherein, in the acquiring the captured reaction image of the user includes:
upon detecting a plurality of users through the camera, acquiring a captured reaction image of any one of the plurality of users who is detected at least one of making a facial expression or gesture or letting out a voice.

* * * * *